United States Patent
Tsukada

(10) Patent No.: US 7,639,576 B2
(45) Date of Patent: Dec. 29, 2009

(54) OPTICAL DISK DEVICE AND OPTICAL DISK RECORDING METHOD

(75) Inventor: Seiji Tsukada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 491 days.

(21) Appl. No.: 10/880,742

(22) Filed: Jul. 1, 2004

(65) Prior Publication Data

US 2005/0025019 A1    Feb. 3, 2005

(30) Foreign Application Priority Data

Jul. 3, 2003    (JP)    .......................... P. 2003-191325

(51) Int. Cl.
*G11B 7/0045*    (2006.01)

(52) U.S. Cl. ..................................... 369/47.52; 369/116

(58) Field of Classification Search ................ 369/47.5, 369/47.51, 47.52, 47.53, 53.26, 116
See application file for complete search history.

(56) References Cited

U.S. PATENT DOCUMENTS 6,067,284 A * 5/2000 Ikeda et al. .................. 369/116
6,115,338 A * 9/2000 Masaki et al. ............. 369/47.52
6,487,151 B1 * 11/2002 Nagata et al. ............. 369/47.51
6,771,577 B2 * 8/2004 Yokoi ....................... 369/59.11
2002/0001270 A1 * 1/2002 Fukuchi et al. ............ 369/53.2
2002/0003760 A1 * 1/2002 Honda ...................... 369/47.52

FOREIGN PATENT DOCUMENTS

JP    9-198658    7/1997

* cited by examiner

*Primary Examiner*—Wayne R Young
*Assistant Examiner*—Thomas D Alunkal
(74) *Attorney, Agent, or Firm*—Morgan, Lewis & Bockius LLP

(57) ABSTRACT

An optical disk device includes a recording power acquiring unit which acquires recording power, a recording unit which records data on an optical disk set in a device body by irradiating laser light of the recording power onto the optical disk, and a laser power control unit which controls power of the laser light. Preferably, the recording power is suited to record data on the optical disk, and the laser power control unit gradually decreases the power of the laser light irradiated in a linking region from the recording power based on a first prescribed condition when recording of data by the recording unit is ended and gradually increases the power of the laser light irradiated in the linking region to the recording power based on a second prescribed condition when the recording of data by the recording unit is started.

4 Claims, 3 Drawing Sheets

OPTICAL DISK DEVICE AND OPTICAL DISK RECORDING METHOD

BACKGROUND OF THE INVENTION

1. Field of the Invention

This invention relates to an optical disk device for recording data on a write-once-read-many (WORM) type or rewritable type of optical disk such as DVD-R/RW and CD-R/RW.

2. Description of the Related Art

Conventionally, optical disk devices for recording data (hereinafter referred to user data) on a write-once-read-many type or rewritable type of optical disk such as DVD-R/RW and CD-R/RW have commonly spread. The WORM type optical disk is capable of recording only once the user data. The rewritable type optical disk is capable of recording the user data repeatedly many times. The optical disk device, when it records the user data on the optical disk set in a device body, performs OPC (Optimize Power Control) prior to recoding of the user data to acquire power of laser light (hereinafter referred to as recording power) optimum to the recording of the user data. The OPC, as well known, refers to processing of stepwise varying the power of laser light to be irradiated on an OPC region given on the optical disk set in the device body, thereby acquiring the power of laser light optimum to recoding of the user data. The optical disk device irradiates the laser light with the recoding power thus acquired onto the optical disk to record the user data. The laser light irradiated onto the optical disk is laser light having a pulse waveform corresponding to the user data to be recorded, the peak thereof represents recording power.

The optical disk device detects the power of laser light which is being irradiated during the recording of the user data, and feedback-controls the quantity of light emitted from LD (laser diode) so that the power detected is the recording power. Particularly, JP-A-9-198658 proposes to irradiate non-pulsating laser light on a linking region between packets and detect the quantity of emitted light, thereby performing the above feedback control.

SUMMARY OF THE INVENTION

A conventional optical disk device, however, when it ends the recording of the user data, irradiates the laser light with recording power in the linking region also. The linking region is a region provided for preventing a continuous writing gap with no data when the user data is newly written. The optical disk device, when it ends the recording of the user data, records a mark (forms a pit) on the linking region, and when it starts the recording of the user data, superposedly records another mark on the mark recorded on the linking region.

Incidentally, the mark recorded in the linking region is not usually the user data.

As described above, since the conventional optical disk device, when it ends the recording of the user data, records the mark on the linking region through irradiation of the laser light with the recording power, the mark formed in the linking region has the same width as the user data. Meanwhile, in the region where pits (inclusive of the user data and mark in the linking region) are formed, a signals indicative of the pits and a wobble signal interfere with each other so that as the case may be, the wobble signal cannot be appropriately detected. As a result, when the user data is written once, the wobble signal cannot be appropriately detected so that the previous recording position of the user data and the present recording position of the user data are deviated from each other in a width direction of a track, thereby leading to a problem of increasing the error rate. Particularly, the rewritable type has a problem that when another user data is recorded on the region where the user data has been already recorded, the recording position is changed so that the user date recorded is not completely erased and so the user data cannot be appropriately rewritten.

An object of this invention is to provide an optical disk device capable of reducing the error rate during reproduction and of appropriately performing rewriting recording by suppressing a difference between the recording position of data when it is newly written and the recording position of the data at the previous time.

The optical disk device according to this invention includes the following structure in order to solve the above problem.

According to an aspect of the present invention, an optical disk device includes a recording power acquiring unit which acquires recording power, a recording unit which records data on an optical disk set in a device body by irradiating laser light of the recording power onto the optical disk, and a laser power control unit which controls power of the laser light. Preferably, the recording power is suited to record data on the optical disk, and the laser power control unit gradually decreases the power of the laser light irradiated in a linking region from the recording power based on a first prescribed condition when recording of data by the recording unit is ended and gradually increases the power of the laser light irradiated in the linking region to the recording power based on a second prescribed condition when the recording of data by the recording unit is started.

In accordance with this configuration, when data recording is ended, the power of laser light irradiated onto the linking region is decreased on the basis of the first condition by the laser power control unit. Thus, the width of marks (pits) formed in the linking region is suppressed. For this reason, interference between the signal indicative of the marks formed in the linking region and a wobble signal can be suppressed, thereby appropriately detecting the wobble signal. Thus, when the user data is newly written or rewritten, deviation of the recoding position of the user data at this time from the recording position of the user data at the previous time can be reduced. Accordingly, the error rate during reproduction can be reduced, and the data previously recorded can be surely erased during rewriting recording, thereby permitting the rewriting of the user data to be appropriately performed.

In accordance with this configuration, the laser power irradiated onto the linking region is not abruptly decreased but gradually increased. For this reason, no mark is formed in the linking region, and no continuous writing gap is formed.

In accordance with this configuration, the laser power irradiated onto the linking regions is increased on the basis of the second condition. For this reason, the marks formed in the linking region can be made approximately equal in their quality level.

According to another aspect of the present invention, an optical disk device includes a recording power acquiring unit which acquires recording power, a recording unit which records data on an optical disk set in a device body by irradiating laser light of the recording power onto the optical disk, and a laser power control unit. Preferably, the recording power is suited to record data on the optical disk, the laser power control unit decreases power of the laser light irradiated in a linking region from the recording power based on a first prescribed condition when recording of data by the recording unit is ended.

According to yet another aspect of the present invention an optical disk recording method including acquiring recording power, recording data on an optical disk by irradiating laser light of the recording power onto the optical disk, and controlling power of the laser light. Preferably, the recording power is suited to record data on the optical disk, and the controlling power of the laser light includes gradually decreasing the power of the laser light irradiated in a linking region from the recording power based on a first prescribed condition when recording of data by the recording unit is ended and gradually increasing the power of the laser light irradiated in the linking region to the recording power based on a second prescribed condition when the recording of data by the recording unit is started.

BRIEF DESCRIPTION OF THE DRAWINGS

Preferred embodiments of the present invention will be described in detail based on the following figures, wherein.

DETAILED DESCRIPTION OF THE INVENTION

Hereafter, an explanation will be given of an optical disk device which is an embodiment of this invention.

Figure 1:
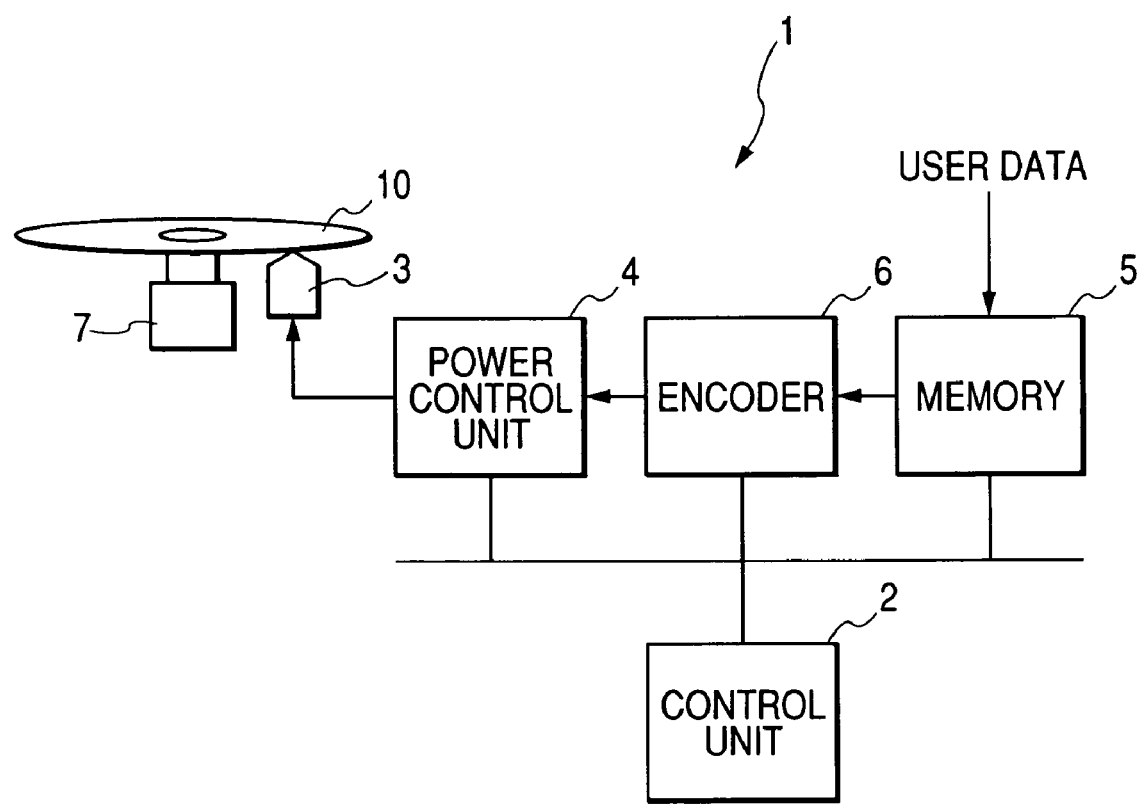
FIG. 1 is a view showing the configuration of the main part of the optical disk device according to an embodiment of this invention.

FIG. 1 is a view showing the configuration of the main part of the optical disk device which is the embodiment of this invention. An optical disk device 1 according to this embodiment includes a control unit 2 for controlling the operation of a device body, a pick-up head 3 for irradiating laser light on an optical disk 10 set in the device body, a power control unit 4 for controlling the power of the laser light to be irradiated onto the optical disk 10 from a pick-up head 3, a memory 5 serving as a buffer memory for temporarily holding the data to be recorded on the optical disk, and an encoder 6 for encoding the data stored in the memory. Incidentally, reference numeral 7 denotes a spindle motor for rotating the optical disk 10.

The pick-up head 3, as well known, includes an LD (laser diode), a PD (photo-diode), an objective lens, etc. The power control unit 4 performs a feedback control of detecting the power of laser light emitted from the LD from the amount of light received by the PD and controlling the input current to the LD on the basis of the power detected to set the power of laser light emitted from the LD at desired power. The power control unit 5 also performs a sloping control of gradually decreasing the power of laser light emitted from the LD when the recording of data is ended and gradually increasing the power of laser light emitted from the LD when the recording of data is started. The power control unit 5 further performs a pulse control of the laser light emitted from the LD according to the data inputted from the encoder 6 during the recording of data. The memory 5 temporarily stores the data (hereinafter referred to as user data) externally supplied and to be recorded on the optical disk.

Next, an explanation will be given of the operation of the optical disk device 1 according to this embodiment.

Incidentally, since the operation relative to the reproduction of data recorded on the optical disk 10 is well known, its explanation is not made here. Further, it is now assumed that the optical disk 10 is a DVD-R (or RW).

Figure 2:
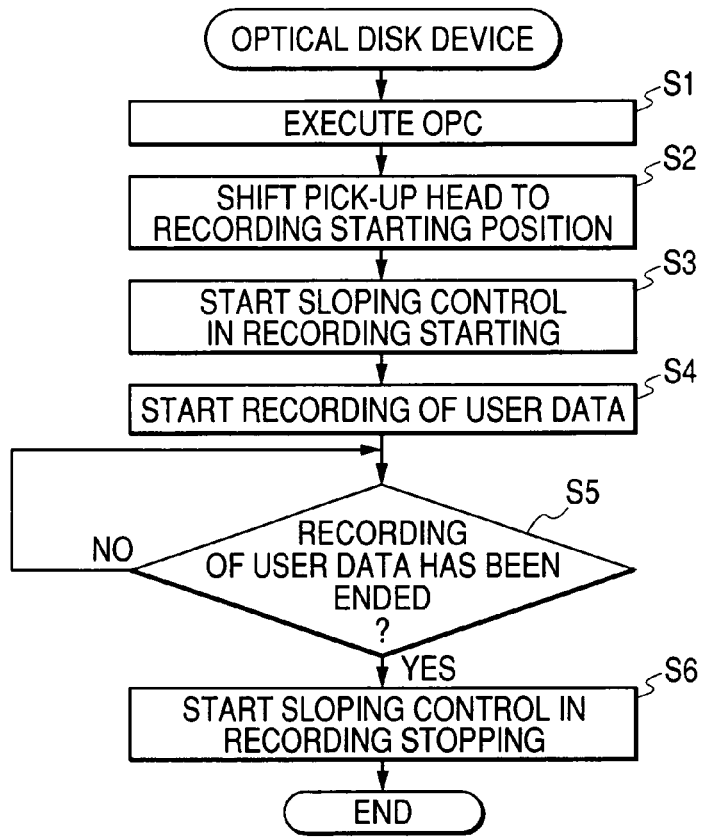
FIG. 2 is a flowchart showing the recording operation of data in the optical disk device according to an embodiment of this invention.

FIG. 2 is a flowchart showing the recording operation of data. The optical disk device 1 stores, in the memory 4, the user data to be recorded on the optical disk 10 set in the device body. First, the optical disk device 1 performs OPC of acquiring the power (hereinafter referred to as recording power) of laser light optimum to the recording of the user data in an OPC region of the optical disk set in the device body (s1). The OPC, as well known, refers to processing of stepwise varying the power of laser light to be irradiated onto the optical disk set to acquire, as the recording power, the power of laser light when the optimum recoding of the user data was obtained.

Figure 3:
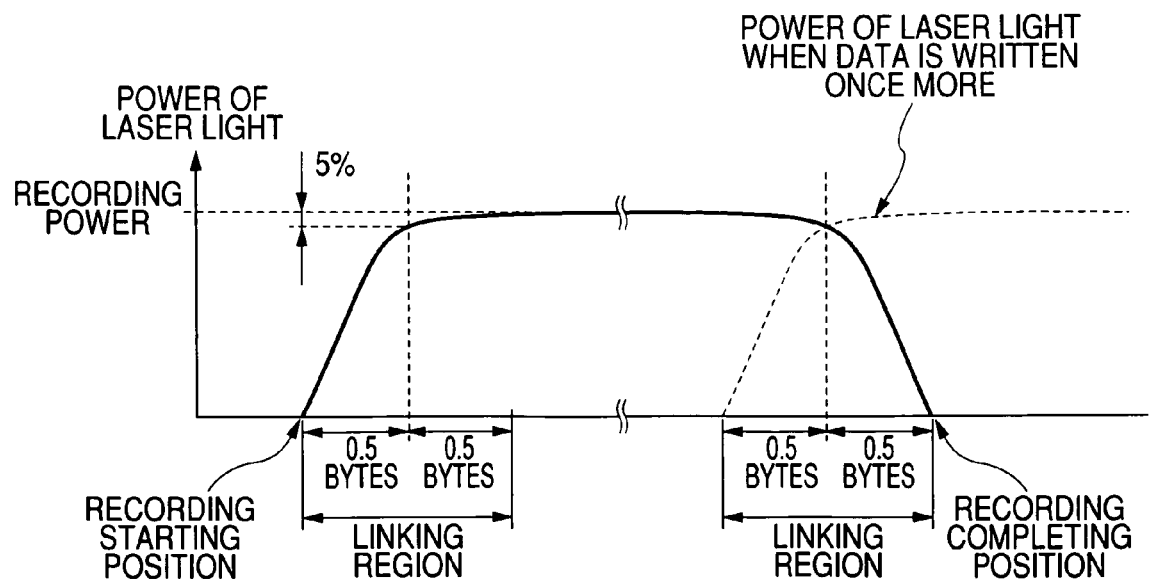
FIG. 3 is a graph showing a change in the laser light when the user data is recorded in the optical disk device according to an embodiment of this invention.

The optical disk device 1, when it acquires the recording power through the OPC, shifts the pick-up head 3 so that the irradiating position of the laser light is located at a recording starting position (s2). This recording starting position is within a linking region which is located at the position of one byte or so before the region where the user data is to be recorded this time (see FIG. 3). The power control unit 4 of the optical disk device 1 performs a recording-starting sloping control of gradually increasing the power of laser light to be irradiated (s3). The recording-starting sloping control in s3 refers to control of gradually increasing the power of laser light along a curve (shown in FIG. 3) in which the power of laser light reaches 95% of the recording power acquired in s1 at the recording position 0.5 byte ahead of the recording starting position and reaches the recording power acquired in s1 at the position further 0.5 byte ahead of this recording position (i.e. recording position 1 byte ahead of the recording starting position). This curve corresponds to the second condition in this invention.

The power control unit 4 starts the recording starting sloping control when the signal indicative of continuation of the recording inputted from the encoder 6 turns from "inactive" to "active". In other words, the optical disk device 1, when it ends the processing of the above s1 and s2, changes the signal indicative of continuation of the recording being inputted from the encoder 6 to the power control unit 4 from "inactive" into "active". Thus, the power control unit 4 starts the recording-starting sloping control.

The optical disk device 1, when the recording-starting sloping control in s3 is ended so that the power of laser light irradiated onto the optical disk 10 reaches the recording power, starts the recording of the user data (s4). In s4, the encoder 6 encodes the user data stored in the memory 5 and supplies the user data encoded to the power control unit 4. The power control unit 4 performs the pulse control of the laser light being irradiated onto the optical disk 10 according to the data input from the encoder 6, thereby recording the user data on the optical disk 10. At this time, the power control unit 4 performs the feedback control so that the peak power of the laser light being pulse-controlled becomes the recording power acquired in s1.

The power control unit 4 of the optical disk device 1, when the recording of the user data is ended, in other words, the data to be encoded in the encoder 6 run out, decides that the recording of the user data has been ended and performs a recording-stopping sloping control (s6) The recording-stopping sloping control in s6 refers to control of gradually decreasing the power of laser light along a curve (shown in FIG. 3) in which the power of laser light reaches 95% of the recording power acquired in s1 at the recording position 0.5 byte ahead of the recording stopping position and reaches 0 (zero) at the position further 0.5 byte ahead of this recording position (i.e. recording position 1 byte ahead of the recording stopping position). This curve corresponds to the first condition in this invention.

The power control unit 4 starts the recording starting sloping control when the signal indicative of continuation of the recording inputted from the encoder 6 turns from "active" to "inactive". In other words, the optical disk device 1, when it ends the recording of the user data, changes the signal indicative of continuation of the recording being inputted from the encoder 6 to the power control unit 4 from "active" into "inactive". Thus, the power control unit 4 starts the recording-stopping sloping control.

Figure 4:
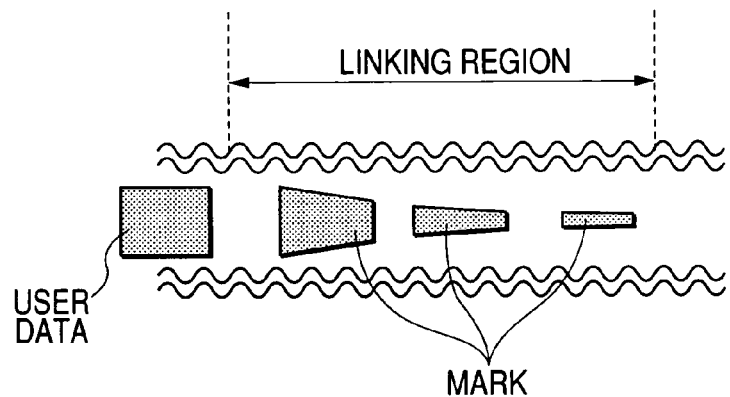
FIG. 4 is a view showing the marks recorded in a linking region.

The power control unit 4, while it performs the recording-stopping sloping processing in s6, irradiates the laser light of an appropriate pulse onto the optical disk 10. The region where the marks are recorded during this period is a linking region. In the linking region, as described above, since the power of laser light is gradually decreased, the marks recorded while the recording-stopping sloping processing is performed gradually become narrow in their width as shown in FIG. 4. The optical disk device 1, when the recording-stopping sloping control in s6 is ended, ends the whole processing.

The region where the marks have been recorded by the recording-stopping in s6 serves as a linking region where the processing will be performed when the user data is recorded at the subsequent time (when the user data is newly written). Since the marks recorded in this linking region gradually become narrow in their width as shown in FIG. 4, when the data is newly written, interference between the signal indicative of the marks formed and the wobble signal can be suppressed. Thus, when the user data is newly written, the deviation of the recording position of the user data at this time from that at the previous time can be reduced. This reduces the error rate during reproduction.

Further, also where the user data is rewritten, likewise, deviation of the recording position of the user data can be suppressed. For this reason, the user data recorded previously can be surely erased, thereby permitting the appropriate rewriting of the user data to be performed.

Figure 5:
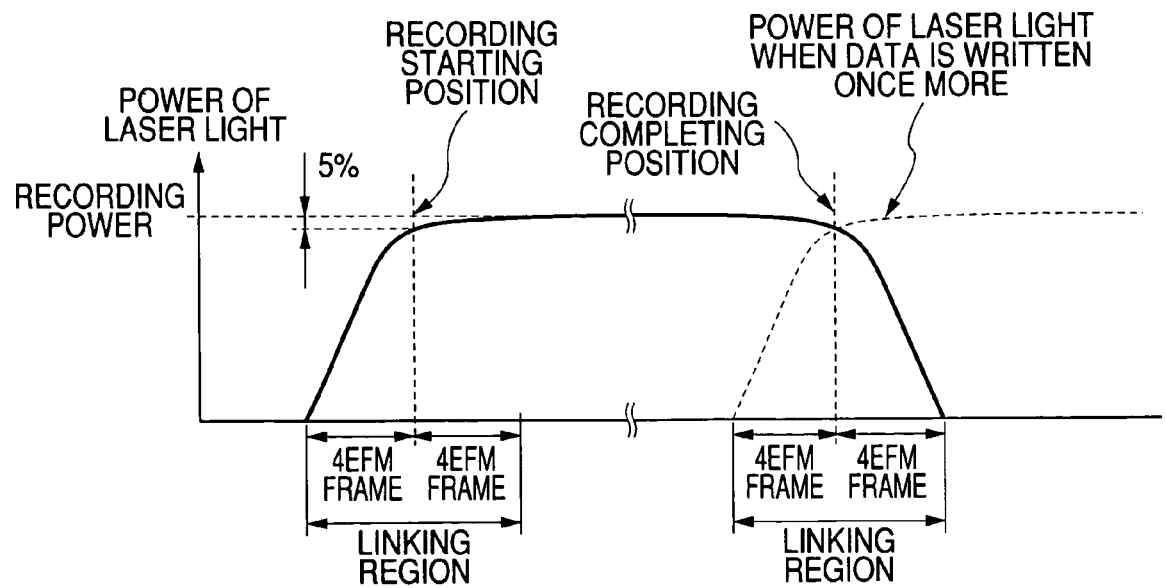
FIG. 5 is a graph showing a change in the laser light when the user data is recorded in the optical disk device according to another embodiment of this invention.

Additionally, the above embodiment has been explained on the case where the optical disk 10 is a DVD-R/RW. This invention can be applied to the case where the optical disk 10 is a CD-R/RW, thereby reducing the deviation of the recording position of the user data at this time from that at the previous time when the user data is newly written. However, because of a difference in standard, in the case of the CD-R (or RW), 4 EFM frames before and after the recording-stopping/starting position are standardized to belong to the linking region. So as shown in FIG. 5, when the recoding is started, in this linking region, the recording-starting sloping processing and the recoding of marks from 4 EFM frames before the recording-starting position are started. Further, the above recording-stopping sloping processing is performed from 4 EFM frames before the recording-stopping position. In this case, the recording of the user data is started from the position 4 EFM frames ahead of the recording-starting position and the recording thereof is ended at the position 4 EFM frames ahead of the recording-stopping position. The recording-stopping position serves as the recording-starting position when the data is newly written.

As understood from the description hitherto made, in accordance with this invention, when the recording of the user data is ended, the power of laser light irradiated onto the linking region is gradually decreased. For this reason, interference between the signal indicative of the marks formed in the linking region and the wobble signal can be suppressed. Thus, when the user data is newly written, the deviation of the recording position of the user data at this time from that at the previous time can be reduced. This reduces the error rate during reproduction. Further, also where the user data is rewritten, the user data recorded previously can be surely erased, thereby permitting the appropriate rewriting of the user data to be performed.

What is claimed is:

1. An optical disk device, operable to record data on an optical disk, comprising:
    a recording unit, operable to irradiate the optical disk with a light beam;
    an acquiring unit, operable to acquire a power of the light beam which is required to record data on the optical disk as a recording level; and
    a control unit, operable to decrease the power of the light beam from the recording level to a power-off level while an irradiating position of the light beam is changed by a first length corresponding to a data length of a half of one byte, after last one of first data is recorded by the recording unit, and operable to increase the power of the light beam from the power-off level to the recording level while an irradiating position of the light beam is changed by the first length, before first one of second data is recorded by the recording unit, wherein:
    the control unit is operable to increase the power of the light beam such that the irradiating position for the second data at which the power of the light beam starts increasing comes before the irradiating position for the first data at which the power of the light beam reaches 95% of the recording power while gradually decreasing, in a case where the second data is recorded additionally to the first data.

2. An optical disk device, operable to record data on an optical disk, comprising:
    a recording unit, operable to irradiate the optical disk with a light beam;
    an acquiring unit, operable to acquire a power of the light beam which is required to record data on the optical disk as a recording level; and
    a control unit, operable to decrease the power of the light beam from the recording level to a power-off level while an irradiating position of the light beam is changed by a first length corresponding to four EFM frames, after last one of first data is recorded by the recording unit, and operable to increase the power of the light beam from the power-off level to the recording level while an irradiating position of the light beam is changed by the first length, before first one of the data is recorded by the recording unit, wherein:
    the control unit is operable to increase the power of the light beam such that the irradiating position for the second data at which the power of the light beam starts increasing comes before the irradiating position for the first data at which the power of the light beam reaches 95% of the recording power while gradually decreasing, in a case where the second data is recorded additionally to the first data.

3. A method of recording data on an optical disk, comprising:
    acquiring a power of a light beam which is required to record data on the optical disk as a recording level;
    irradiating the optical disk with a light beam to record data thereon;

decreasing the power of the light beam from the recording level to a power-off level while an irradiating position of the light beam is changed by a first length corresponding to a data length of a half of one byte, after last one of first data is recorded; and increasing the power of the light beam from the power-off level to the recording level while an irradiating position of the light beam is changed by the first length, before first one of second data is recorded, wherein;

the irradiating position for the second data at which the power of the light beam starts increasing comes before the irradiating position for the first data at which the power of the light beam reaches 95% of the recording power while gradually decreasing, in a case where the second data is recorded additionally to the first data.

4. A method of recording data on an optical disk, comprising:

acquiring a power of a light beam which is required to record data on the optical disk as a recording level;

irradiating the optical disk with a light beam to record data thereon;

decreasing the power of the light beam from the recording level to a power-off level while an irradiating position of the light beam is changed by a first length corresponding to four EFM frames, after last one of first data is recorded; and increasing the power of the light beam from the power-off level to the recording level while an irradiating position of the light beam is changed by the first length, before first one of second data is recorded, wherein;

the irradiating position for the second data at which the power of the light beam starts increasing comes before the irradiating position for the first data at which the power of the light beam reaches 95% of the recording power while gradually decreasing, in a case where the second data is recorded additionally to the first data.

* * * * *